July 5, 1938. R. C. JACOBS 2,122,645
ADJUSTABLE VEHICLE SEAT
Filed June 15, 1936 2 Sheets-Sheet 1
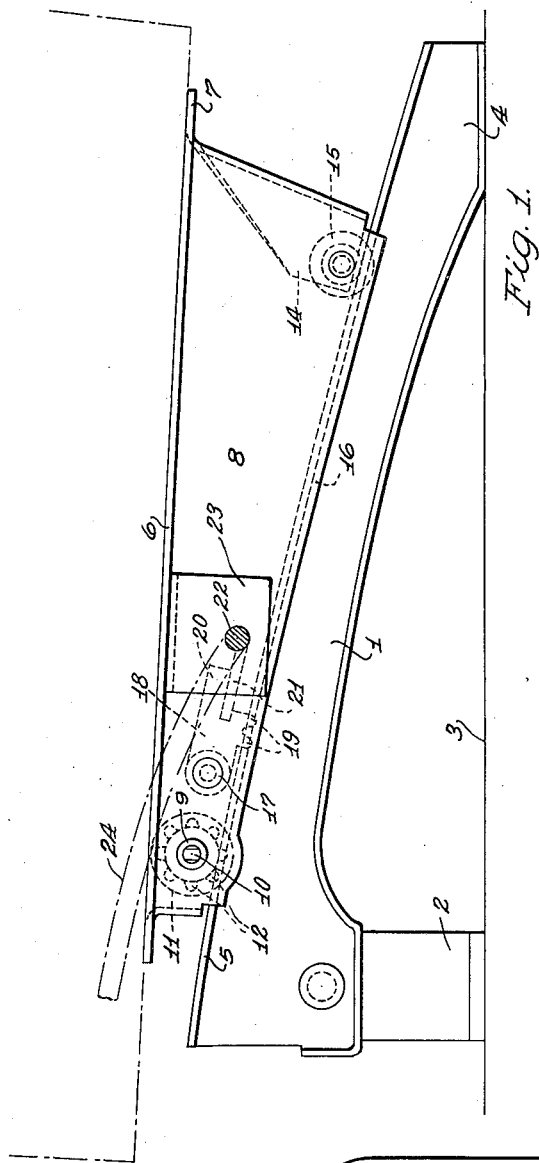
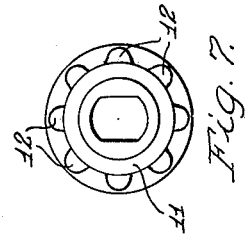
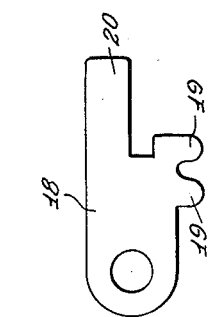
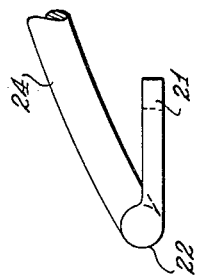
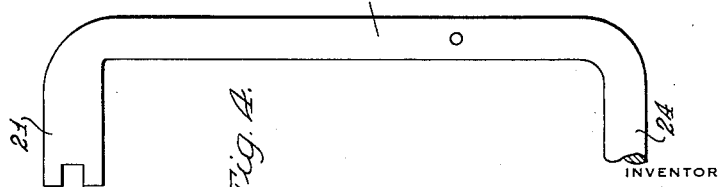
INVENTOR
Rex C. Jacobs
BY
ATTORNEYS

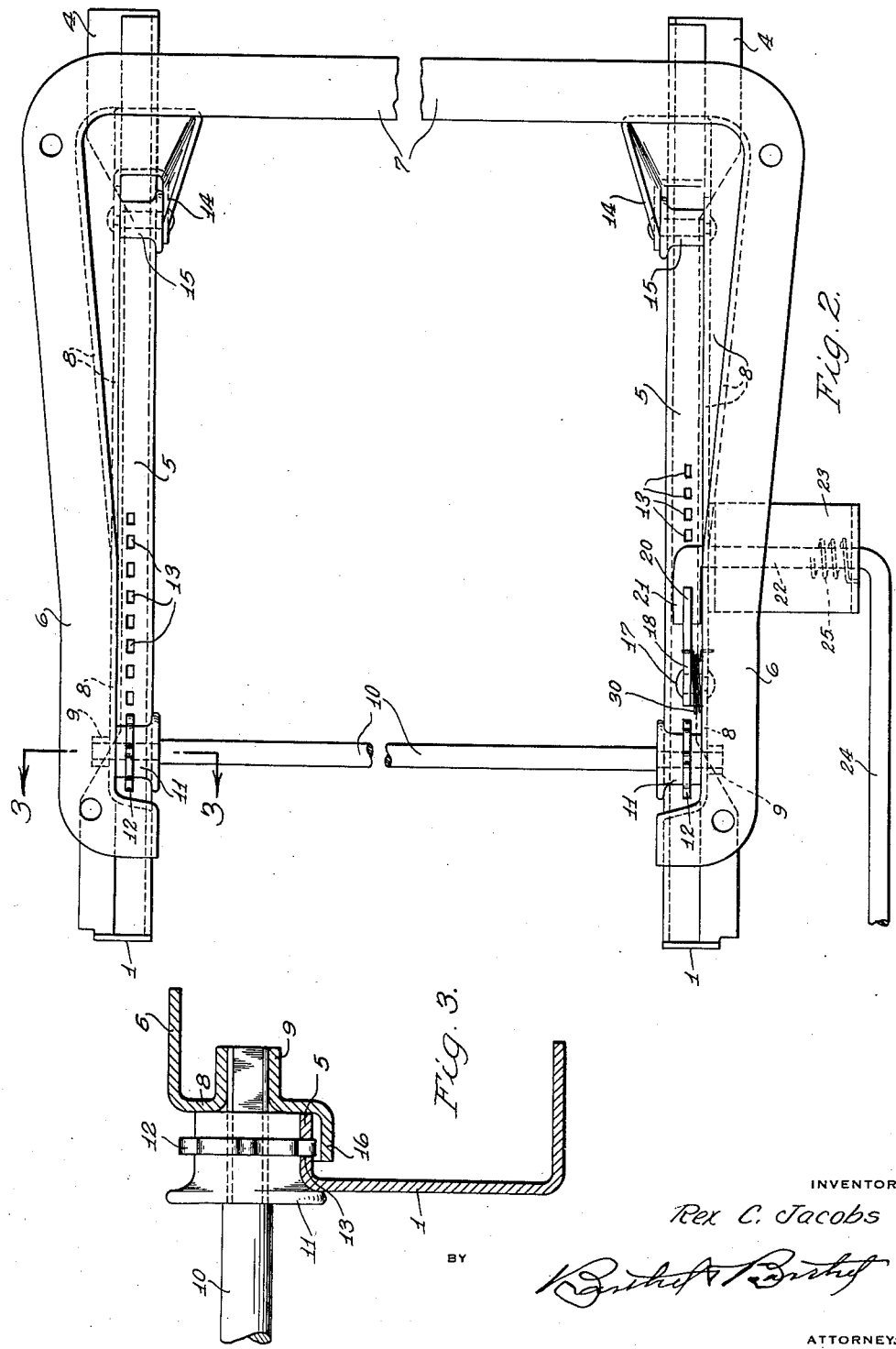

Patented July 5, 1938

2,122,645

UNITED STATES PATENT OFFICE 2,122,645

ADJUSTABLE VEHICLE SEAT

Rex C. Jacobs, Detroit, Mich.

Application June 15, 1936, Serial No. 85,343

4 Claims. (Cl. 155—14)

This invention relates to seats for automotive vehicles, and more particularly to seats which are adjustable forwardly and rearwardly and also as to angularity.

The primary object of the present invention is to provide an adjustable vehicle seat with means for holding it in various positions of adjustment, the said means being manually releasable whereby it permits adjustment movement when such is desired.

Another object of the present invention is to provide adjustable means for supporting a vehicle seat comprising guide and slide means arranged at or adjacent opposite sides of the seat and means in combination with such guide and slide means for maintaining the seat in a position whereby its movement is always parallel to the plane of the guides and for preventing angular displacement of the seat when it is stationary so as to permit the use of a single locking mechanism acting in conjunction with one of the guide and slide means. Ordinarily the use of a single locking mechanism arranged at one side of the vehicle seat would permit the other side, which is unheld, to move a certain amount due to flexibility inherent in the seat supporting structure whereas the invention provides means for preventing such movement when a single locking means is employed.

Another object of the present invention is to provide a seat locking mechanism of the character referred to above which is inexpensive to manufacture, rugged and durable, and which is positive and sure in operation, the lock members being designed whereby they may be formed as stampings and whereby they may be quickly and easily assembled.

With the above and other ends in view the invention consists in matters hereinafter more particularly pointed out with reference to the accompanying drawings, in which Fig. 1 is a side elevation;

Fig. 2 is a plan view;

Fig. 3 is a section taken on the line 3—3 of Fig. 2;

Figs. 4 and 5 are fragmental elevations of a detail;

Fig. 6 is an elevation of a detail, and

Fig. 7 is an elevation of another detail.

Like characters of reference are employed throughout to designate corresponding parts.

The present adjustable seat support comprises two guides 1 each having their forward ends pivotally attached to a bracket 2, which ordinarily is secured to the floor 3 of a vehicle, and their other ends 4 loosely resting upon the floor 3. Each guide 1 has an outwardly directed flange 5 at the top thereof providing a supporting surface, the supporting surface preferably being of arcuate form when viewed in side elevation, as in Fig. 1. A substantially U-shaped frame is provided which is adapted for attachment to the vehicle seat, the frame being formed with two substantially parallel arms 6 united by an integral transverse portion 7. Adjacent to the forward ends of the arms 6 depending portions 8 thereof are formed with bearings 9 rotatably receiving the ends of a cross shaft 10. Flanged rollers 11 are secured to the shaft 10 and rest upon the top surfaces of adjacent guides 1, the rollers having a series of radial projections 12, similar to gear teeth, which extend into slots 13 formed in respective flanges 5. The two rollers 11 are identical in construction and the slots 13 in the two flanges 5 are equally spaced apart.

At the rear ends of the arms 6 are provided brackets 14, integral with the U frame and rotatably supporting rollers 15 which also rest upon the top surfaces or flanges 5 of the guides. It becomes apparent, therefore, that the sets of rollers 11 and 15 support the seat supporting frame so that it may traverse the guides 1. Because the two rollers 11 are secured together engagement of the teeth 12 thereon in the slots 13 causes the two arms to move in absolute unison. In order to retain the frame on the guides for such movement the depending portions 8 are provided with inwardly extending flanges 16 which project beneath the guide flanges 5, the flanges 16 being sufficiently loose that they permit the frame to move freely with respect to the guides. When the seat frame is moved forwardly on the guides the arcuate top surface thereof, which is normally inclined in a direction toward its front end, causes the seat frame to be tilted forwardly and as the rollers move down the inclined surfaces the seat frame is tilted rearwardly.

Pivotally secured to the depending portion 8 of one of the arms 6 by the pin 17 is a latch element 18 having a pair of spaced apart dogs 19 and a spring 30 is provided to normally urge pivotal movement thereof so as to cause engagement of the dogs 19 with the slots 13 in the adjacent flange 5. Engagement of the dogs 19 with the slots 13 holds the seat supporting frame against forward or rearward movement with respect to the guides 1. The latch element 18 has an endwise projecting arm 20 engaged by the arm 21 on a rod 22 which is rotatably supported in the depending portion 8 of the adjacent arm 6 and by a supplemental bracket 23 secured to said depending portion. Each rod 22 has an actuating arm 24 bent to suit the particular installation and a spring 25 acting to rotate the same to a position where the arm 21 permits the latch to move the dogs 19 into the adjacent slots 13. By moving the arm 24 by manual pressure the arm 21 may be moved to actuate the latch to remove the dogs 19 from slots 13 with which they are in engagement whereby the seat frame becomes free to move and upon release of such manual pressure the springs 30 and 25 act to move the parts back to their initial position and the dogs 19 into engagement with slots 13.

Although a specific embodiment of the invention has been illustrated and described it will be understood that various changes may be made within the scope of the appended claims without departing from the spirit of the invention, and such changes are contemplated.

What I claim is:

1. In combination, a pair of sheet metal guide members having flanges extending lengthwise thereof, a pair of sheet metal seat brackets, fore and aft rollers rotatably mounted on said brackets and having rolling contact with the top surfaces of said flanges, means uniting said fore rollers whereby they rotate in unison, said flanges having series of apertures therein and constituting racks, said fore rollers having radial projections thereon adapted to mesh with respective racks, flanges on said brackets extending beneath the guide flanges and maintaining said rollers in rolling contact with the top surfaces of the guide flanges and said radial projections in mesh with said racks, a latch member pivotally mounted on one of said brackets adjacent its fore roller, spring biasing means normally holding said latch in engagement with the rack with which the adjacent fore roller meshes, and manual means for retracting said latch from engagement with said rack.

2. In combination, a pair of sheet metal guide members, having flanges extending lengthwise thereof, a pair of sheet metal seat brackets, fore and aft rollers rotatably mounted on said brackets and having rolling contact with the top surfaces of said flanges, means uniting said fore rollers whereby they rotate in unison, said flanges having series of apertures therein and constituting racks, said fore rollers having radial projections thereon adapted to mesh with respective racks, flanges on said brackets extending beneath the guide flanges and maintaining said rollers in rolling contact with the top surfaces of the guide flanges and said radial projections in mesh with said racks, a latch member pivotally mounted on one of said brackets adjacent its fore roller, spring biasing means normally holding said latch in engagement with the rack with which the adjacent fore roller meshes, a supplemental bracket on said last mentioned bracket, and a manually operable lever supported by said last mentioned and supplemental bracket, said lever having means adapted upon movement thereof to engage said latch and retract it from engagement with said rack.

3. In combination, a pair of sheet metal guide members, having flanges extending lengthwise thereof, a pair of sheet metal seat brackets, fore and aft rollers rotatably mounted on said brackets and having rolling contact with the top surfaces of said flanges, means uniting said fore rollers whereby they rotate in unison, said flanges having series of apertures therein and constituting racks, said fore rollers having radial projections thereon adapted to mesh with respective racks, flanges on said brackets extending beneath the guide flanges and maintaining said rollers in rolling contact with the top surfaces of the guide flanges and said radial projections in mesh with said racks, a latch member pivotally mounted on one of said brackets adjacent its fore roller, spring biasing means normally holding said latch in engagement with the rack with which the adjacent fore roller meshes, a supplemental bracket on said last mentioned bracket, a manually operable lever supported by said last mentioned and supplemental bracket, said lever having means adapted upon movement thereof to engage said latch and retract it from engagement with said rack, and spring biasing means normally holding said lever inoperative to retract said latch.

4. In combination, a pair of sheet metal guide members having flanges extending lengthwise thereof, a pair of sheet metal seat brackets, fore and aft rollers rotatably mounted on said brackets and having rolling contact with the top surfaces of said flanges, means uniting said fore rollers whereby they rotate in unison, said flanges having series of apertures therein and constituting racks, said fore rollers having radial projections thereon adapted to mesh with respective racks, flanges on said brackets extending beneath the guide flanges and maintaining said rollers in rolling contact with the top surfaces of the guide flanges and said radial projections in mesh with said racks, a latch member pivotally mounted on one of said brackets adjacent its fore roller, spring biasing means normally holding said latch in engagement with the rack with which the adjacent fore roller meshes, said latch having a projecting arm, and a manual lever pivoted in said last named bracket and having a bent end engaging said arm whereby pivotal movement of the lever retracts said latch from engagement with said rack.

REX C. JACOBS.